United States Patent [19]

Höarler

[11] Patent Number: 4,541,785
[45] Date of Patent: Sep. 17, 1985

[54] SELF-PRIMING CENTRIFUGAL LUBRICATING OIL PUMP OF AN EXHAUST GAS TURBOCHARGER

[75] Inventor: Hansulrich Höarler, Zurich, Switzerland

[73] Assignee: BBC Brown, Boveri & Company, Limited, Baden, Switzerland

[21] Appl. No.: 603,320

[22] Filed: Apr. 24, 1984

[30] Foreign Application Priority Data

Apr. 29, 1983 [CH] Switzerland .................. 2311/83

[51] Int. Cl.[4] ...................... F04B 17/00; F02C 7/06
[52] U.S. Cl. .................................. 417/407; 60/39.08; 384/465; 184/31
[58] Field of Search .................. 417/405, 406, 407; 384/465, 471, 472; 184/6.11, 6.16, 29, 31, 26; 60/39.08

[56] References Cited

U.S. PATENT DOCUMENTS

| | | | |
|---|---|---|---|
| 2,042,575 | 6/1936 | Worth | 384/472 |
| 2,929,663 | 3/1960 | Hoeltje | 384/465 |
| 3,048,118 | 8/1962 | Erd | 415/175 |
| 3,069,133 | 12/1962 | Swearingen | 415/175 |
| 3,180,568 | 4/1965 | Oettle | 415/175 |
| 3,318,644 | 5/1967 | Johnson | 184/31 |
| 3,410,616 | 11/1968 | Dee | 417/407 |
| 3,457,871 | 7/1969 | Herger | 184/26 |
| 4,251,186 | 2/1981 | Chomel et al. | 184/31 |
| 4,323,289 | 4/1982 | Suzuki | 384/465 |

Primary Examiner—Carlton R. Croyle
Assistant Examiner—Timothy J. Thorpe
Attorney, Agent, or Firm—Burns, Doane, Swecker & Mathis

[57] ABSTRACT

In a self-priming centrifugal lubrication pump of an exhaust gas turbocharger, the pump rotor is fastened on the turbocharger shaft between two shaft bearings. A stationary oil ring channel is located on a larger diameter outside a rotating annulus of oil, which channel is connected via an oil branch pipe and an oil pressure pipe to the injection nozzles located at the side of the shaft bearings.

3 Claims, 2 Drawing Figures

SELF-PRIMING CENTRIFUGAL LUBRICATING OIL PUMP OF AN EXHAUST GAS TURBOCHARGER

FIELD OF INVENTION

The invention concerns oil pumps in rotating machinery and more particularly, a self-priming centrifugal lubricating oil pump of an exhaust gas turbocharger.

BACKGROUND OF THE INVENTION

Exhaust gas turbochargers are usually equipped with rolling bearings which, because of the high rotational speeds, have to be lubricated and cooled by large quantities of injected oil whereas, during starting and at low rotational speeds, they can operate without any oil at all. The quantity of oil injected needs to be accurately determined and should increase approximately in proportion to the rotational speed. The injection of the oil into the rolling body race of the rolling bearing should take place near the bearing inner ring. The lubricating oil is sucked from the oil sump by a centrifugal pump located on the shaft of the turbocharger and is passed through the rolling bearing. Part of the oil can be injected for cooling purposes directly onto the thermally heavily loaded parts.

Self-priming centrifugal lubricating oil pumps of the this type are known, for example, from the Swiss Pat. No. 451,714. In this device, the lubricating oil pump is attached to one end of the turbocharger shaft and, for this reason, can only be used in turbochargers with external bearings because this system depends on a relatively small internal diameter of the rotating oil ring relative to the bearing diameter, which, for design reasons, cannot always be attained in turbochargers with internal bearings.

The lubrication of the shaft bearing of an exhaust gas turbocharger with internal bearings is normally carried out by means of an external pump, for example a gear or piston pump. Such a pump requires a separate drive and much space; in addition, it requires maintenance and the failure rates of individual components are not negligible.

OBJECTS AND SUMMARY OF THE INVENTION

The object of the invention is, therefore, to produce a highly effective reliable lubricating oil pump which can also be used for exhaust gas turbochargers with internal bearings.

This object is achieved, in accordance with the invention, by a self-priming centrifugal lubricating oil pump having a pump rotor on the turbocharger shaft between the bearings, with a stationary U-shaped oil ring channel spaced radially outside the rotating annulus of oil. An oil passage connects an injection nozzle in the channel with the bearings to supply oil to the bearings while the shaft is rotating.

The advantages attained by means of the invention are mainly to be seen in that an adequate injection pressure is attained in a centrifugal lubricating oil pump provided for exhaust gas turbochargers with internal bearings, even where there is no design possibility of directly using the oil pressure generated in an annulus of oil rotating with the shaft, due to the centrigural force effect, for injection into the shaft bearing.

The location of a centrifugal lubricating oil pump directly on the shaft of an exhaust gas turbocharger with internal bearings eliminates the factors which can adversely affect the availability of the turbocharger.

BRIEF DESCRIPTION OF THE DRAWING

A preferred embodiment of the invention is shown in the drawing, wherein.

The same parts are indicated by the same reference signs in the figures. The flow direction of the lubricating oil is indicated by arrows. Those parts of the exhaust gas turbocharger which are not important to the invention, such as the turbine, compressor, etc., are omitted.

DETAILED DESCRIPTION OF THE PREFERRED EMBODIMENT

Figure 1:
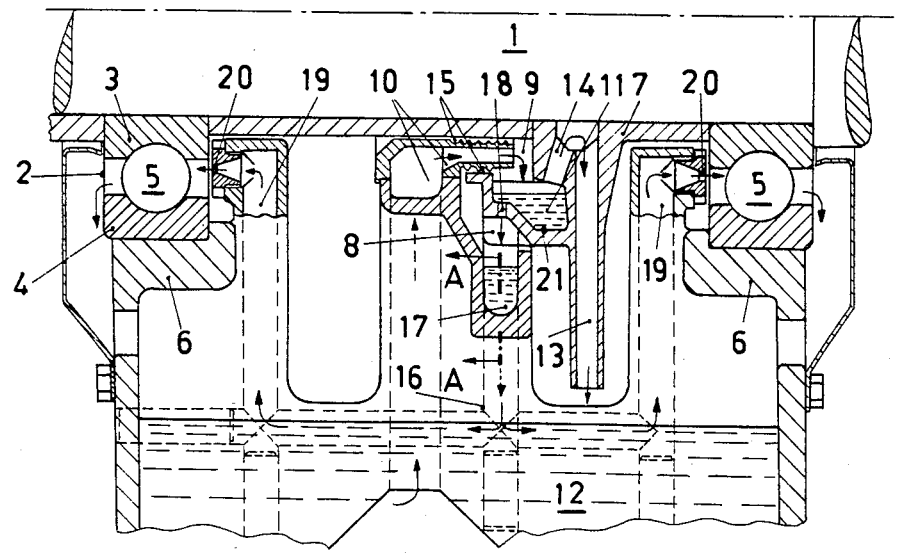
FIG. 1 is, in longitudinal section, a self-priming centrifugal lubricating oil pump of an exhaust gas turbocharger with internal bearings, which pump is constructed in accordance with a preferred embodiment of the present invention.

In the lubricating oil pump shown in FIG. 1, the turbocharger shaft 1 is supported in a casing 6 by means of shaft bearings 2, consisting of a bearing inner ring 3, a bearing outer ring 4 and rolling bodies 5. A pump rotor 7 equipped with radially located air vent ducts 13 is fastened to the turbocharger shaft 1. The lower end of an oil suction pipe 10 is immersed in an oil sump 12. The upper end of the oil suction pipe 10 is connected to a hollow space 9, in which a vacuum is generated during operation due to the suction effect of the air vent ducts 13.

During operation, the oil sucked from the oil sump 12 forms, due to the centrifugal force effect, a rotating annulus of oil 11 in the hollow space chamber 9. The oil pressure in this rotating annulus of oil 11 increases with increasing radius in accordance with an exponential function.

A build-up of pressure in the rotating annulus of oil 11, starting at a small radius, would be the necessary condition for injecting the oil from the rotating annulus of oil directly into a bearing with a smaller diameter because the injection of the oil into the rolling body race must take place near the bearing inner ring 3.

In the case of a lubricating oil pump provided for an exhaust gas turbocharger with internal bearings, it is not possible, however, to make the inner radius of the rotating annulus of oil smaller than the radius at which the injection nozzles 20 are located, which would be the necessary condition for effective injection into the shaft bearing 2. The turbocharger shaft 1 cannot be reduced in thickness at the position of the pump rotor 7 for strength reasons and the bearing diameter selected cannot be made larger because the centrifugal forces, the frictional energy and the material temperature would increase.

In accordance with the invention, the pump rotor 7 is now fastened onto the turboshaft 1 between two shaft bearings 2. Seal gaps 15 are located between the pump rotor 7 and the stationary oil suction pipe 10. The hollow space 9 of the pump rotor 7, in which the rotating annulus of oil 11 forms, has a pocket 21, which acts as a dirt separator. In order to mainain a constant pressure in the hollow space 9, the air brought in through the seal gaps 15 and by the oil has to be continually removed. This takes place by means of the suction effect of the air vent ducts 13.

In order to prevent the lubricating oil from emerging through the air vent ducts 13 of the pump rotor 7, the air is first led radially inwards through oil-trap holes 14, through which the oil cannot follow due to the centrifugal force effect. These oil-trap holes 14 are located as far radially inwards as possible. The ejection holes 18 located on the pump rotor 7 are so dimensioned and are located just so far radially outwards that they are sure to be provided with a small depth of cover at their internal opening by the internal radius of the rotating annulus of oil 11. This achieves the advantage that, with a minimum loss of swirl performance, the air is prevented from penetrating through the ejection holes 18 into the hollow space 9, which is under vacuum. It is very important to the oil suction pipe 10 that there should be no throttle points because, in this case, the oil flow would be insufficient.

In the air vent ducts 13 of the pump rotor 7, the air is forced outwards by the centrifugal force effect during operating; this causes a vacuum in the hollow space 9 and the oil is sucked from the oil sump 12 through the oil suction pipe 10. Because of wall friction, a rotating annulus of oil 11 forms in the hollow space 9, the inner radius of which annulus of oil depending on the oil supply and the oil ejection through the ejection holes 18 to the stationary oil annular channel 17. An oil pressure builds up in the rotating annulus of oil 11 due to the centrifugal force effect. Any possible dirt in the oil is deposited on the outer internal wall of the hollow space 9, which is formed in the shape of a pocket 21, and is removed from time to time.

With correctly dimensioned ejection holes 18, a certain vacuum is generated automatically in the hollow space 9, provided the inner diameter of the annulus of oil is a few millimeters smaller than the diameter at which the openings of the ejection holes 18 are located. In the diameter of the annulus of oil decreases, the oil pressure at the openings into the ejection holes 18 increases, more oil is ejected and the diameter of the annulus of oil increases again, and vice versa. By this means, the oil level or inner diameter of the rotating annulus of oil, and hence the vacuum in the hollow space 9, is kept constant at a constant rotational speed. The stationary U-shaped oil ring channel 17 is located at a larger diameter outside the rotating annulus of oil 11. This channel 17 is connected via an oil branch pipe 16 and oil pressure pipe 19 to the injection nozzles 20 located at the side of the shaft bearings 2. The ejection of the oil takes place from the rotating annulus of oil 11 into the stationary oil ring channel 17, which catches the oil flowing with swirl from the ejection holes 18.

Figure 2:
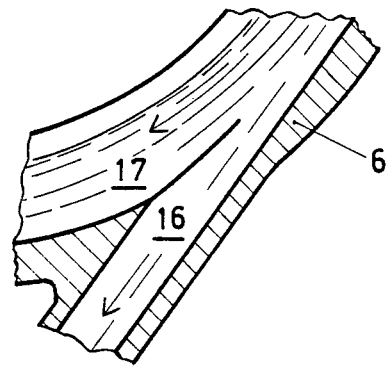
FIG. 2 shows a radial section along the line A—A in FIG. 1.

So that the oil droplets do not lose too much swirl, radial ribs 8 to generate an air vortex are provided on the pump rotor 7. A rotating annulus of oil forms in the oil ring channel 17, the inner diameter of which annulus of oil so adjusts itself that the centrifugal force pressure at its outer radius is just sufficient to inject the oil through the oil pressure pipe 16 and the injection nozzles 20 into the rolling bearings. In order to increase the oil pressure in the injections nozzles 20, the oil branch pipe 16 is preferably designed to be tangential to the oil ring channel 17, as shown in FIG. 2. The oil pressure attainable with such a ring channel 17 is approximately 2 bar.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

I claim:

1. A self-priming centrifugal lubricating oil pump of an exhaust gas turbocharger, of the type having a pump rotor located on the turbocharger shaft and provided with air vent ducts and an oil suction pipe having a lower end which communicates with an oil sump and an upper end which communicates with a hollow annular chamber, which chamber receives a rotating annulus of oil during operation due to the centrifugal force effect, the improvement comprising the pump rotor being fastened on the turbocharger shaft between two shaft bearings, a stationary U-shaped oil ring channel being located at a larger diameter outside the rotating annular chamber, said U-shaped oil ring channel being connected via an oil branch passage to injection nozzles located at the side of the shaft bearings.

2. The self-priming centrifugal lubricating oil pump in accordance with claim 1, wherein said oil branch passage includes a pipe located tangentially to the oil ring channel.

3. The self-priming centrifugal lubricating oil pump in accordance with claim 1, wherein said hollow annular chamber in which the rotating annulus of oil forms during operation has a pocket, which acts as a dirt separator.

* * * * *